United States Patent [19]

Bischoff

[11] 4,333,319
[45] Jun. 8, 1982

[54] UNIVERSAL JOINT ASSEMBLY
[75] Inventor: Walter Bischoff, Münster-Wolbeck, Fed. Rep. of Germany
[73] Assignee: Gelenkwellenbau GmbH, Essen, Fed. Rep. of Germany
[21] Appl. No.: 162,530
[22] Filed: Jun. 24, 1980
[30] Foreign Application Priority Data
  Jul. 3, 1979 [DE] Fed. Rep. of Germany ....... 2926710
[51] Int. Cl.³ .............................................. F16D 3/26
[52] U.S. Cl. ....................................... 464/26; 403/57; 403/122; 464/27; 464/118; 464/134; 464/136; 464/901
[58] Field of Search ................ 64/17 R, 17 A, 19, 6, 64/27 F, 31; 403/57, 122

[56] References Cited
U.S. PATENT DOCUMENTS

| | | | |
|---|---|---|---|
| 1,744,155 | 1/1930 | Bijur | 64/17 R |
| 1,979,557 | 11/1934 | Keller | 403/57 |
| 3,447,232 | 6/1969 | Stillwagon, Jr. | 64/17 R |
| 3,626,719 | 12/1971 | Church | 64/6 |
| 3,975,922 | 8/1976 | Orain | 64/17 R |

FOREIGN PATENT DOCUMENTS 626270  8/1978  U.S.S.R. ............. 64/17 R

*Primary Examiner*—P. S. Lall
*Attorney, Agent, or Firm*—Toren, McGeady & Stanger

[57] ABSTRACT

A universal joint assembly which includes a first and a second yoke operatively interconnected by a trunnion cross arranged therebetween is formed with a generally centrally located bore extending through the trunnion cross between the first and the second yoke with a bolt extending within the bore interconnecting the first and second yoke through the trunnion cross. One end of the bolt is attached to a radially movable member in the first yoke and lock means are provided for locking the radially movable element in any selected position in order to fix the position of a connecting member joined to the second yoke so that interconnection of torque transmitting elements may be facilitated.

7 Claims, 9 Drawing Figures

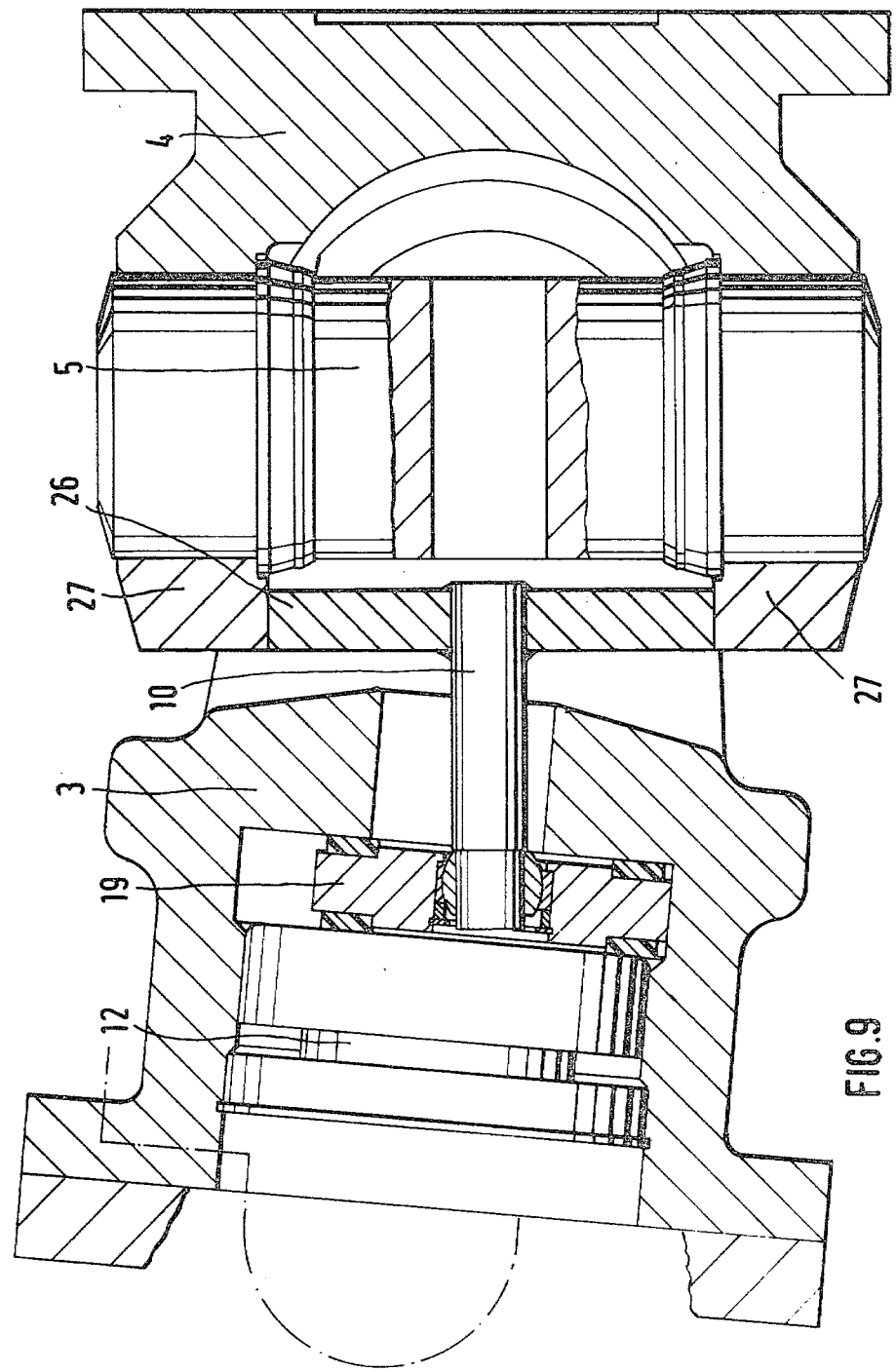

UNIVERSAL JOINT ASSEMBLY

The present invention relates generally to universal joint assemblies and more particularly to a universal joint which is composed of a pair of yokes interconnected by a trunnion cross arranged therebetween. The yokes of the joint assembly of the type to which the present invention relates have bores with cylindrical bearing pins to support the trunnion cross relative thereto in axially fixed position and hollow cylindrical bearing members containing rolling or sliding bodies may possibly also be provided. The trunnion cross in the joint of the type to which the invention relates has a generally centrally located bore extending perpendicularly to the plane of the pins and each of the yokes has a centrally arranged bore.

In universal joints known in the prior art, for example German Pat. No. 3,711,177, which are intended for use in rolling mills, angle limitation must be provided which operates independently from the angle of rotation of the universal joint shaft and independently of the torque to be transmitted by the universal joint shaft. However, disadvantages have arisen in this connection in that, although the angle of the universal joint shaft may be limited in the case of a change of rollers, it is not always possible to insure that the connecting wobblers of various universal joint shafts which are to be individually connected with the universal joint assembly during a roll change will be aligned parallel to each other.

This disadvantage produces a negative influence in the case of a roller change because a set of rollers consisting of at least two rolls will be changed in each case. An advantageous set-up time is achieved only when the connecting wobblers are properly aligned during the assembly of the rolls.

In view of the foregoing, the present invention is directed toward the construction of a universal joint shaft assembly which does not involve limiting the diameter of rotation in such a way that the bending angle of each universal joint must be limited to a selected value during the stand still of the universal joint shaft assembly.

SUMMARY OF THE INVENTION

The present invention may be generally described as a universal joint assembly which comprises first and second yoke means with trunnion cross means therebetween connecting said first and second yoke means for torque transmission. A generally centralized bore is defined to extend through the trunnion cross means between the first and second yoke means and bolt means extending within the bore connected between the first and second yoke means through the trunnion cross means is arranged with one end connected at the first yoke means through radially movable means in the first yoke means. Thus, in accordance with the present invention, the objects of the invention are obtained in that the bolt means beginning from the bore in the first yoke means is connected to the second yoke means and is angularly movably received in the radially movable element of the first yoke means. By means of the present invention, a locking device is provided whereby the radially movable element may be fixed in any desired position.

In accordance with the present invention, advantages are derived in that the assembly may be adjusted at any bending angle which may be selected independently from the angle of rotation of the universal joint shaft. Therefore, in the case of a roll change, it is possible to fix the connecting wobbler in that position which had existed prior to the disassembly of a prior set of rolls. The angle of inclination of the universal joint shafts is not important in this connection.

In order to insure an appropriate locking action of the connecting wobbler at the appropriate position, it is provided in accordance with another essential feature of the invention that the locking device be comprised of a pressure member which is operated hydraulically, pneumatically or mechanically and which is guided in an axially extending bore.

In this regard it is advantageous in generating a force acting upon the locking device that there may be utilized means which are already present in a roll stand, such as a hydraulic system.

In accordance with another embodiment of the invention, an intermediate member formed of a material having a high coefficient of firction is arranged between the end face of the pressure member and the surface of the radially movable element facing toward the pressure member and/or the surface of the element facing toward the recess of a yoke.

By means of such intermediate members, which may for example be friction linings, it is possible to easily fix at a certain value the appropriate parts which are made of steel so that appropriate angle positioning may be maintained.

It is further provided in accordance with the present invention that at least one hydraulically, pneumatically or mechanically operated pressure member which cooperates with the bolt through a spherical element be provided as the locking device.

By means of a pressure cylinder of this type it is possible to correct or change an already adjusted angle even after disassembly of a set of rollers, inasmuch as the pressure will act on the bolt at a right angle.

In order to enable adjustment of the entire joint shaft assembly in any selected manner, wherein its universal joint shafts are fixed at either end, it is provided in accordance with another embodiment of the invention, when two universal joint shafts are used which are connected by an intermediate shaft, to arrange the bolt in the first yoke means with the internal shaft extending from the first yoke of one universal joint to the first yoke of the other universal joint, wherein the internal shaft disposed in the interior of the intermediate shaft may be angularly movably supported with the same spacing from both universal joints.

In accordance with a further feature of the invention it is provided that an intermediate bearing of the internal shaft has unequal spacing from the two universal joints.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 9 is a sectional view of a locking device wherein the bolt of the assembly is rigidly arranged in a yoke.

DETAILED DESCRIPTION OF PREFERRED EMBODIMENTS

Figure 1:
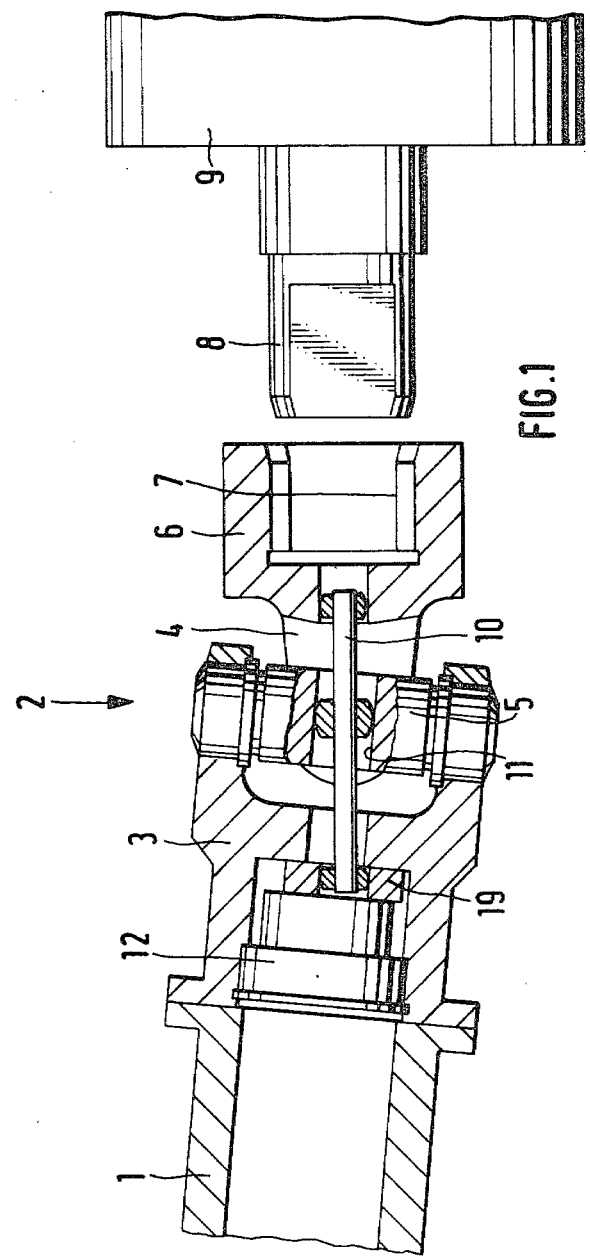
FIG. 1 is a general sectional view of a universal joint shaft assembly having a connecting wobbler.

Referring now to the drawings wherein similar reference numerals refer to like parts throughout the various figures thereof, there is shown in FIG. 1 a simplified illustration of a universal joint shaft assembly of the type to which the present invention relates. The universal joint shaft assembly of FIG. 1 consists essentially of an intermediate shaft 1 and of a universal joint 2. The universal joint 2 includes yokes 3 and 4 with a trunnion cross 5 being received in the bores of the yokes. The yoke 4 is connected to a connecting wobbler 6 having a bore adapted to receive a neck 8 of a roll or roller 9. In order to facilitate insertion of the roll neck 8 in the bore 7, both of these devices have chamfered surfaces.

It will be clear from FIG. 1 that, when performing a change of rollers in a rolling mill, which requires the necessity to separate the universal joint shaft 1 with the connecting wobbler 6 from the roll 9, reassembly of the roll neck 8 may become difficult when the connecting wobbler 6 is tilted downwardly due to its own weight. For the purpose of saving time during assembly, the universal joint shaft is provided with a connecting wobbler 6 due to the fact that this insures torque transmission to the roll neck 8 as a result of the shape differing from a circular cross section.

A flanged connection with screws, or an oil pressure joint or the like would be considered overly expensive in this regard since there would be required excessive time in performing the needed functions.

Limitation of the angle of the connecting wobbler 6 is affected by means of a bolt 10 which extends from the yoke 4 through a bore 11 of the trunnion cross 5 to the yoke 3. Any selected angle may be fixed by means of a locking device 12.

Figure 2:
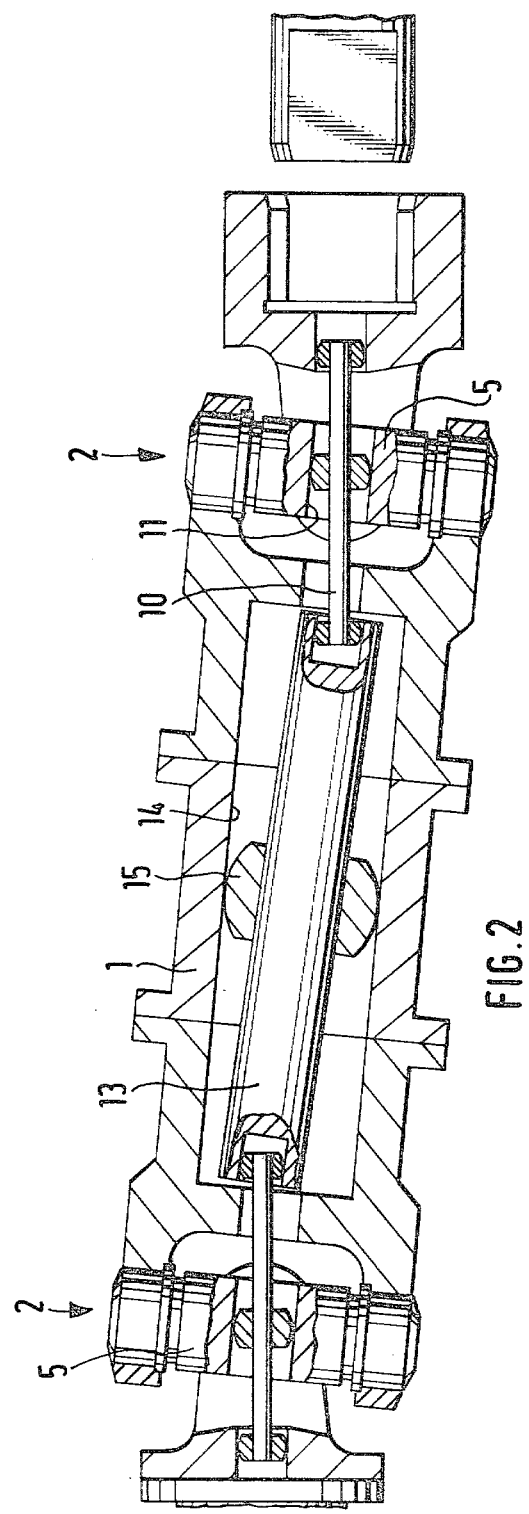
FIG. 2 is a general sectional view of another embodiment of a universal joint shaft with a connecting wobbler.

In FIG. 2 there is shown a universal joint shaft assembly wherein the intermediate shaft 1 is provided with universal joints 2 at either end thereof. The two universal joints 2 each have a trunnion cross 5, and a bolt 10 required for angle limitation extends through the central bores 11 of the trunnion cross.

In principal, this simplified illustration in FIG. 2 corresponds to a component already illustrated in FIG. 1 the difference being however that both bolts 10 are axially received and angularly movable in an internal shaft 13 on the side facing the intermediate shaft 1. This internal shaft 13 is supported in the bore 14 of the intermediate shaft 1. A bearing 15 is provided in the form of a ring having a cylindrical internal bore and a spherical external surface such that the internal shaft 13 may perform axial movement as well as angular movement. As a result of this type of support, the internal shaft 13 serves as a transmission member such that when the internal shaft 13 is symmetrically mounted, the angle of one universal joint 2 has, in the opposite direction, the same magnitude as the angle of the other universal joint.

Figure 3:
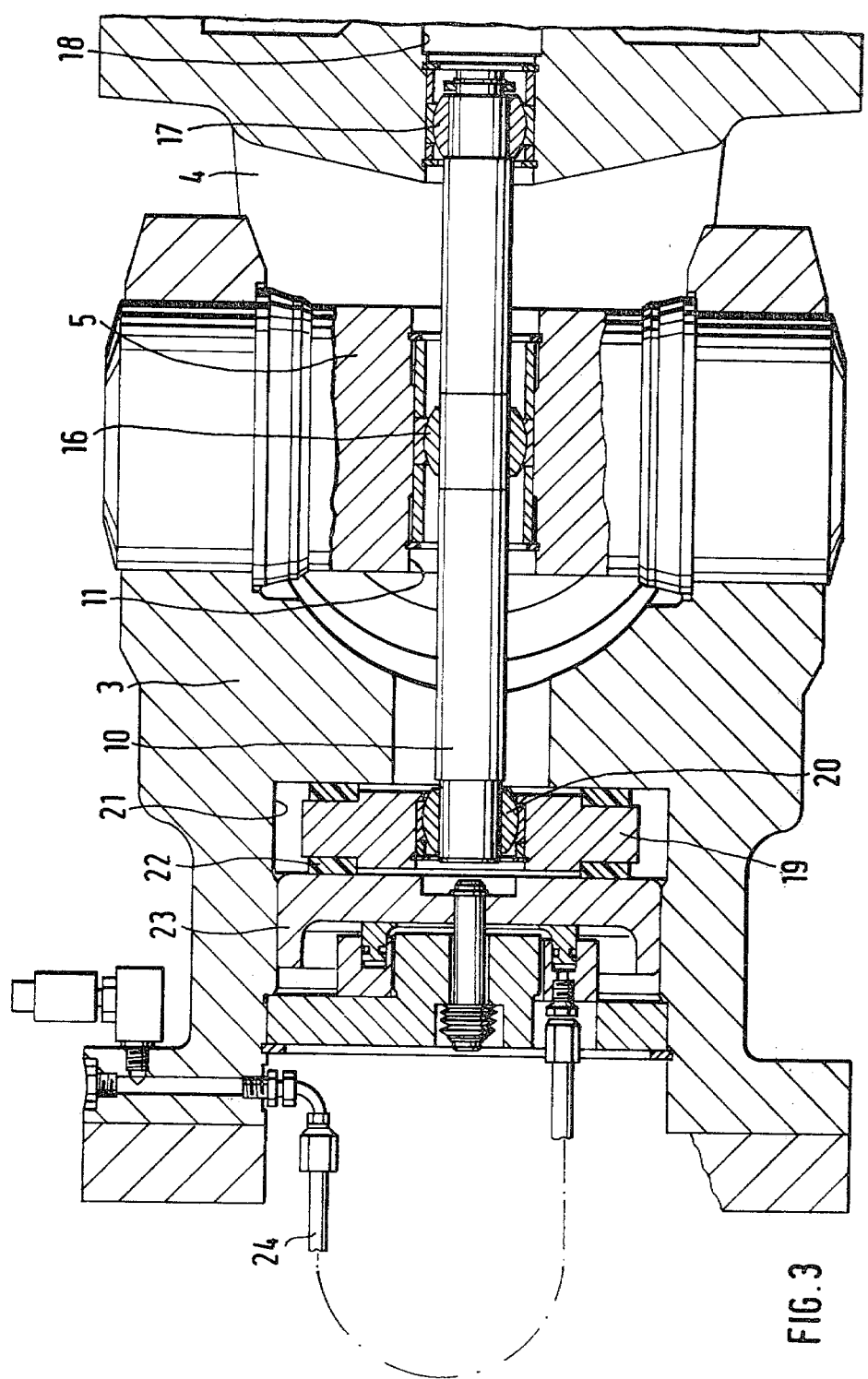
FIG. 3 is a sectional view showing a universal joint assembly in accordance with FIG. 1 having a hydraulic locking device.

FIG. 3 shows in more detail and on a larger scale a universal joint of the type shown in FIG. 1. The joint consists essentially of yokes 3 and 4 and the trunnion cross 5. The trunnion cross 5 has a centrally located bore 11 through which the bolt 10 extends. The bolt 10 is supported for axial and angular movement within the bore 11 by means of an externally spherical element 16 which has a cylindrical inner bore. The bolt 10 is supported for angular movement in a bore 18 in the yoke 4 by means of another supporting element 17. On the other hand, the bolt is supported by the radially movable element 19 in the central bore of the yoke 3 and by an intermediately arranged ring 20 which is provided with a spherical external surface. The element 19 is arranged to be radially movable in a recess 21 wherein the two end faces are provided with a lining 22, the material of this lining having a high coefficient of friction. A pressure member 23 acts in the axial direction on the element 19 and in this embodiment, the pressure member 23 is operated hydraulically by means of a pipe line 24. Upon deflection of the universal joint, the element 19 will move radially outwardly so that, before the connecting wobbler 6 is separated from the neck of a roll, the element 19 will be fixed in this position by means of the hydraulically or pneumatically operated pressure member 23. As a result of the fact that the recess 21 is produced as an internally turned recess and since the pressure member 19 is shaped in the form of a disc, the bending angle may be secured at any selected value.

Figure 4:
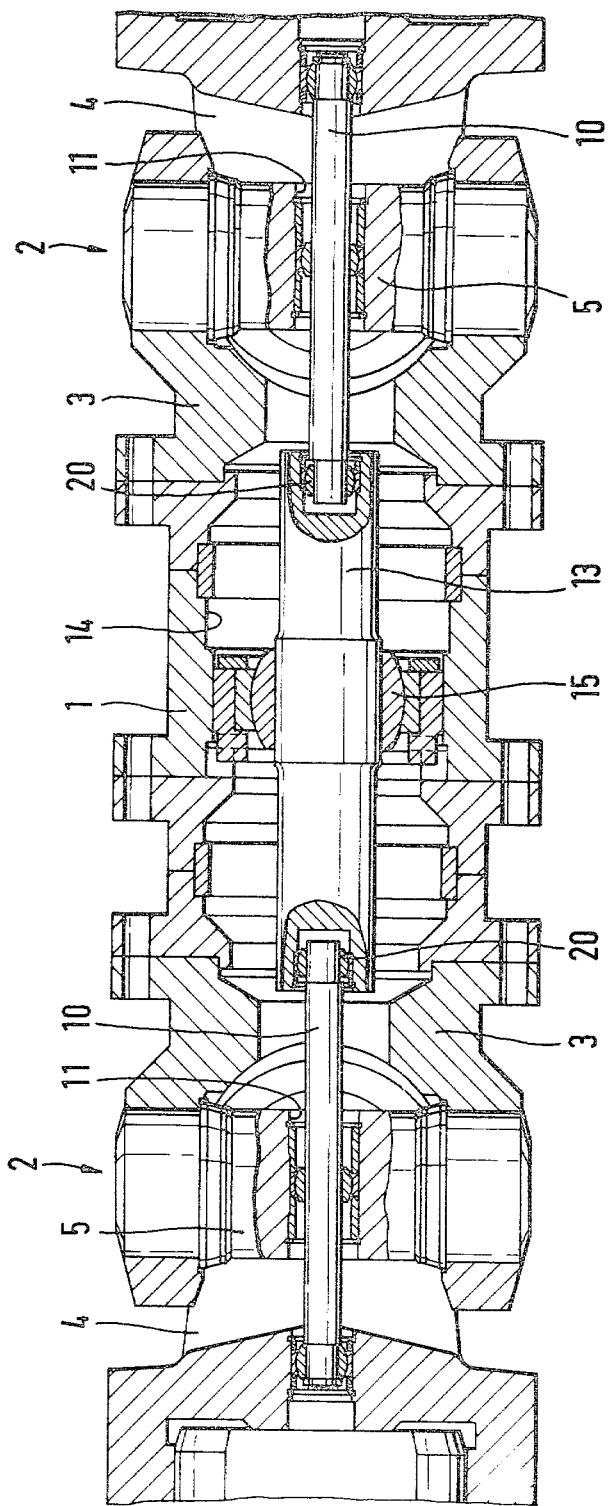
FIG. 4 is a sectional view of a universal joint shaft assembly having ends which are provided with two universal joints, each having an angle limiting device.

FIG. 4 shows a universal joint shaft assembly in accordance with the type of assembly shown in FIG. 2 wherein the intermediate shaft 1 and two universal joints 2 are illustrated. The principal of this universal joint assembly corresponds to that of the individual joints which have already been described in connection with FIG. 3 since in this case the respective trunnion cross is also provided with a central bore 11 through which a bolt 10 extends and within which the bolt 10 is supported for axial and angular movement. In the respective yokes 4, the two bolts 10 are supported for angular movement, principally in the manner illustrated in connection with FIG. 3. However, in this embodiment, a locking device is not provided in the yokes 3. On the contrary, deflection of one joint is transmitted into an angle with the reverse sign of the other joint by means of the intermediate tube 13. For this purpose, the intermediate tube 13 is provided with a bore into which the bolt 10 projects and in which the bolt 10 is supported for angular movement by means of a ring 20 having a spherical external surface. The internal shaft 13 is, in turn, received in the bore 14 of the intermediate shaft 1 so that it may also be angularly movable and axially slideable by means of an appropriately designed bearing 15. In this embodiment, it is possible that the connecting wobbler may be aligned parallel relative to the yoke of the first universal joint in any position when the bearing 15 of the internal shaft 13 is arranged symmetrically. If such a symmetrical arrangement should not be desired, a positive or negative transmission may be introduced by means of an asymmetrically arranged bearing 15.

Figure 5:
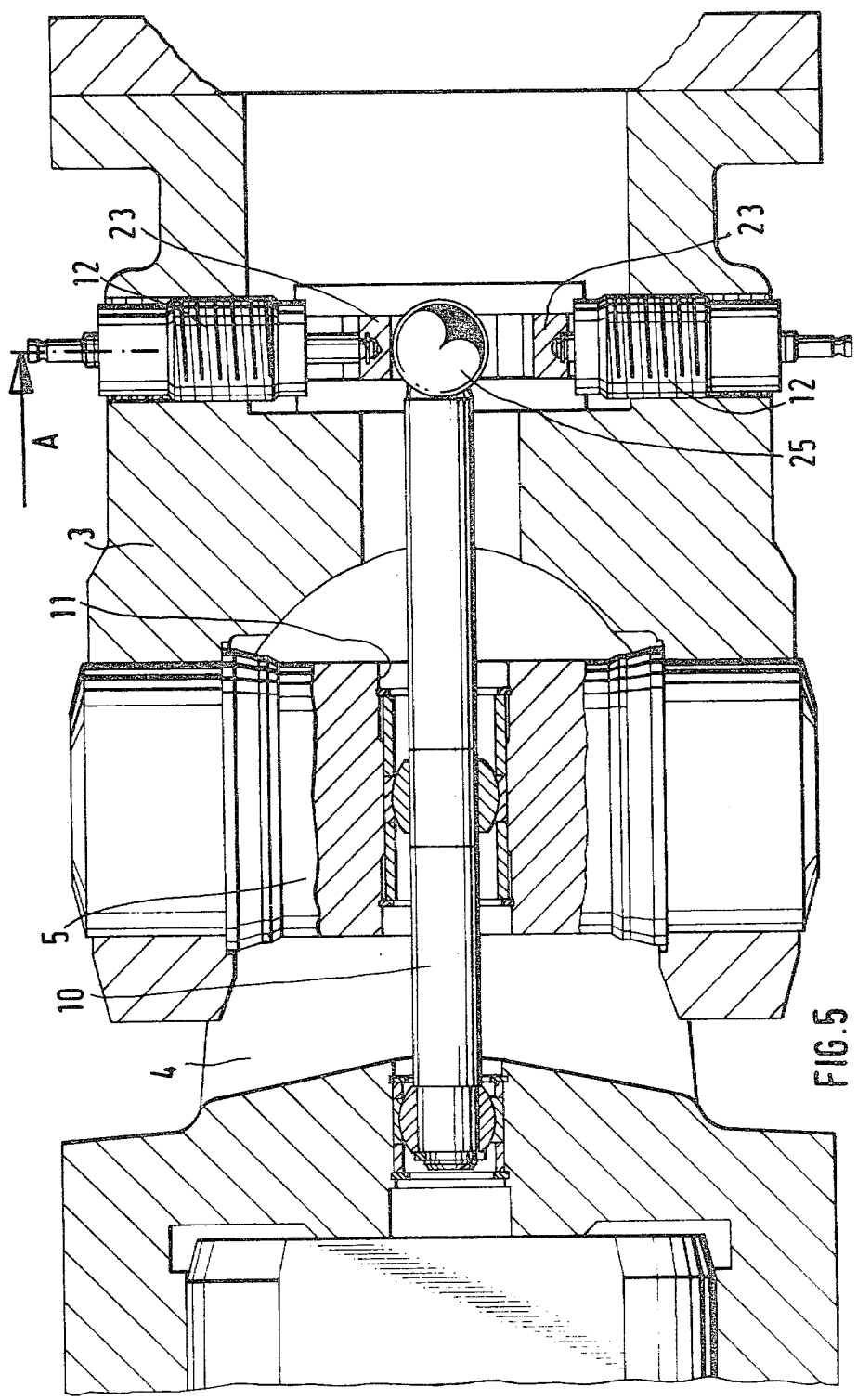
FIG. 5 is a sectional view showing a universal joint assembly according to FIG. 3 including a radially acting locking device.

Another embodiment is depicted in FIG. 5 wherein angle limitation is provided, this embodiment again essentially involving a universal joint assembly with a yoke 3 and a yoke 4 wherein the trunnion cross 5 is arranged in the bores of the yokes. The central bore 11 of the trunnion cross 5 is again utilized for supporting the bolt 10 with the bolt being, in turn, received for angular movement in the yoke 4. The yoke 3 has a locking device 12 which acts on a spherical element 25 arranged at the end of the bolt 10. When the bolt 10 is radially moved in the case of deflection, the presently assumed angle may be fixed by means of an appropriate pressure application of the pressure members 23.

Figure 6:
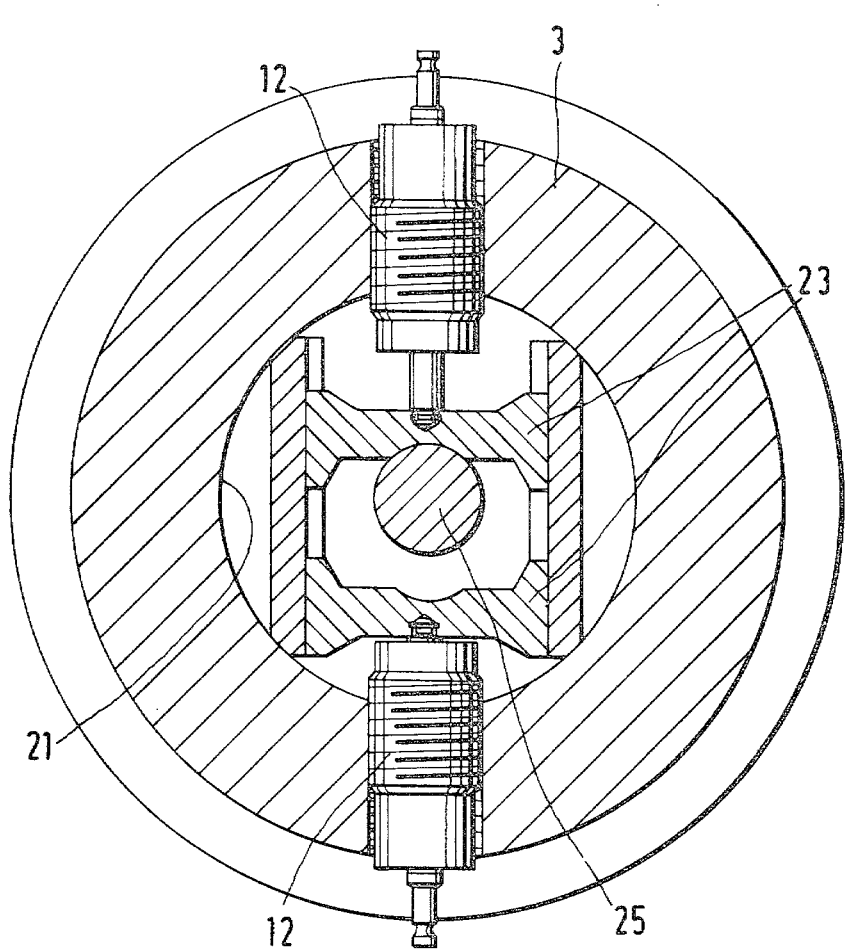
FIG. 6 is a sectional view taken along the line A of FIG. 5.

FIG. 6 is a sectional view of the locking device shown in FIG. 5. The pressure members 23 are provided for radial movement in a recess 21 of the yoke 3 and they are arranged to act on the bolt 10 so that, after a certain angle has been assumed, and with pressure application from the locking device 12, the pressure members 23 are fixed either hydraulically or pneumatically and thus the angle of the universal joint will be fixed.

Figure 7:
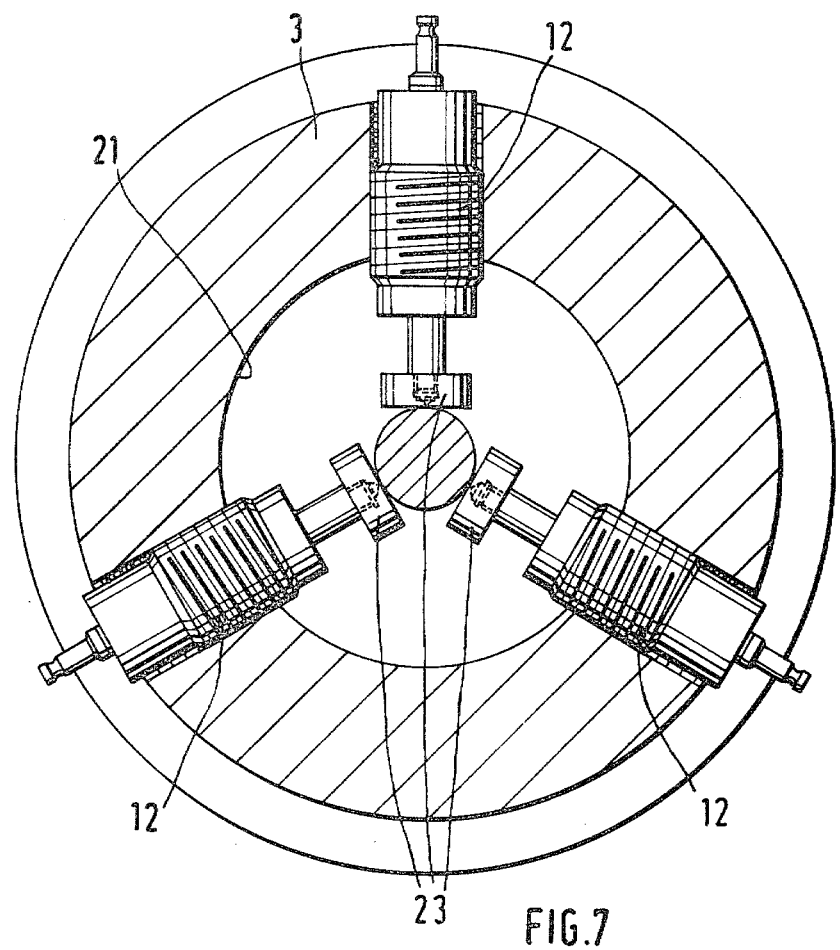
FIG. 7 is a sectional view of another modification of a locking device.

FIG. 7 shows a further embodiment of a locking device 12 wherein three pistons are used such that with pressure application of the pressure member 23, the bolt 10 may be fixed in any position when an appropriate angle has been assumed for disassembly of the rolls.

Figure 8:
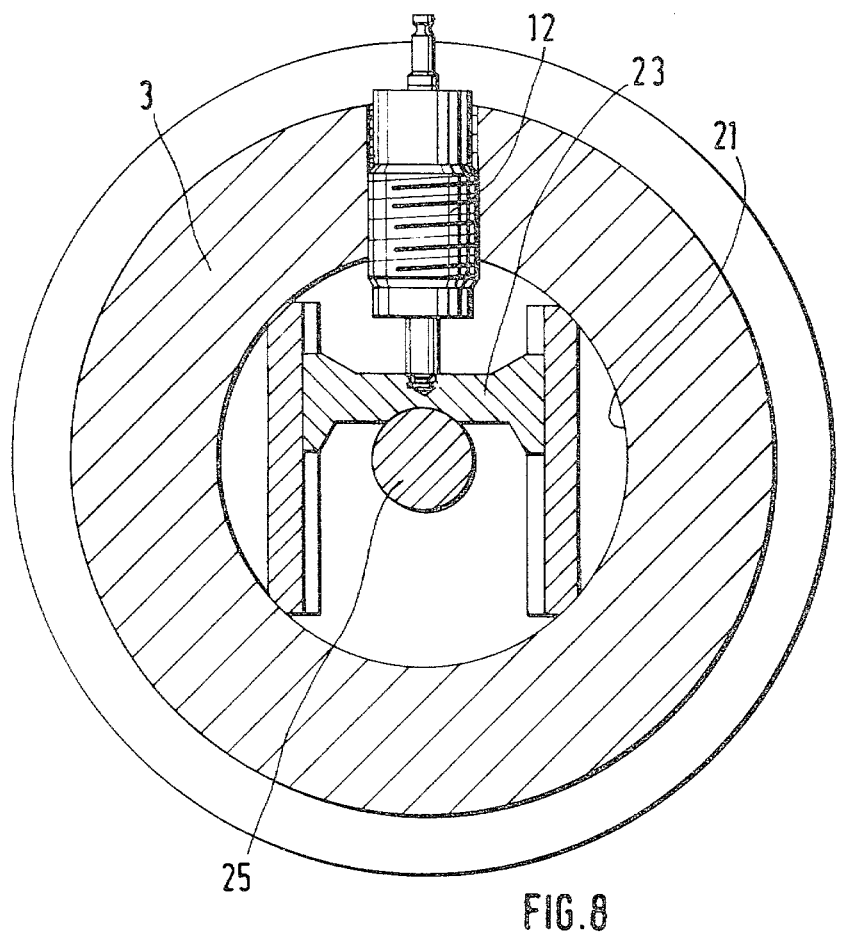
FIG. 8 is a sectional view of a locking device with a single cylinder.

In the locking device 12 illustrated in FIG. 8, only one pressure member 23 is provided, with the member 23 acting on the bolt 10. In this case, angle limitations are possible which extend perpendicularly to the axis of the universal joint shaft.

FIG. 9, on the other hand, shows a locking device 12 wherein the bolt 10 is fastened in a yoke 27 through a connecting member 26. Upon deflection of the joint in this embodiment, the element 19 moves radially outwardly and can subsequently be fixed in the appropriate position by the locking device 12.

While specific embodiments of the invention have been shown and described in detail to illustrate the application of the inventive principles, it will be understood that the invention may be embodied otherwise without departing from such principles.

What is claimed is:

1. A universal joint assembly comprising: first and second yoke means; trunnion cross means operatively connected between said first and second yoke means for torque transmission therebetween; means defining a generally centralized bore extending through said trunnion cross means between said first and second yoke means; bolt means extending within said bore connected between said first and second yoke means through said trunnion cross means; radially movable means in said first yoke means having said bolt means angularly movably received therein; and locking means for locking said radially movable means in any selected position thereof.

2. A universal joint assembly according to claim 1 wherein in the region between said trunnion cross means and said first yoke means, said bolt is rigidly connected to said second yoke means by a member which connects the yoke arms of said second yoke means.

3. A universal joint assembly according to claim 1 wherein said locking means comprise a pressure member which is guided in an axially extending bore, said pressure member being operated as one of a hydraulically, pneumatically or mechanically actuated device.

4. A universal joint assembly according to claim 3 wherein said radially movable means comprise a radially movable member and an intermediate piece formed of material having a high coefficient of friction, said intermediate piece being arranged between said pressure member and said radially movable member.

5. A universal joint assembly according to claim 3 wherein said locking means comprise a spherical element operatively interposed to cooperate between said bolt means and said locking means.

6. A universal joint assembly according to claim 1 wherein a pair of universal joints are connected by an intermediate shaft, each of said pair of universal joints including said first and said second yoke means and said trunnion cross means, each of said pair of universal joints including said bolt means arranged in operative connection with said first yoke means of each of said universal joints, said assembly further comprising an internal shaft extending from the first yoke means of one of said pair of universal joints to the first yoke means of the other of said pair of universal joints, said internal shaft extending in the interior of an intermediate shaft extending between said pair of universal joints supported to be angularly movable with equal spacing from both universal joints.

7. A universal joint assembly according to claim 6 wherein said internal shaft comprises intermediate bearing means having unequal spacing from said pair of universal joints.

* * * * *